United States Patent Office 3,666,642
Patented May 30, 1972

3,666,642
PROCESS OF FORMING ALUMINUM FOIL
Abdul Sahib Alwan, Tazewell, Va., and Ralph Antonio Ruscetta, Columbia, S.C., assignors to General Electric Company
Filed Mar. 19, 1971, Ser. No. 126,044
Int. Cl. C23b 1/00
U.S. Cl. 204—141                         5 Claims

ABSTRACT OF THE DISCLOSURE

An aluminum foil of controlled and uniform porosity is provided. The porous foil is made by a process comprising a first etching of the foil, an oxidation step, and a subsequent electrochemical etching of previously eached and oxidized foil. The porous aluminum foil of the invention is particularly useful in the construction of double anode electrolytic capacitors.

BACKGROUND OF THE INVENTION

This invention relates to electrolytic aluminum capacitors and more particularly to porous aluminum foil for electrolytic capacitors.

Aluminum foil of controlled porosity is useful in the construction of electrolytic aluminum capacitors as anode material because the porosity acts to extend the effective surface area of the foil to include both surfaces or sides of the foils.

In the more commonly used coil construction, both surfaces or sides of the anode foil can be used even without communication therebetween by the sandwiching of the anode foil between layers of the cathode foil. However, when it is desired to expand the effective surface area, two anode foils are used in the coil, one on either side of the cathode. To maximize the effectiveness of this type of construction, it is necessary to provide communication, through the anode foil, from the side of the anode foil facing the cathode to the opposite side of the anode foil. This communication is obtained by providing openings or pores within the foil. The pores should be large enough to remain open during subsequent process steps in the formation of the capacitor, yet remain small enough to minimize the loss of surface area which occurs by pore formation.

SUMMARY OF THE INVENTION

It is therefore an object of the invention to provide an aluminum foil of controlled and uniform porosity.

It is an other object of the invention to provide a method of making an aluminum foil of controlled and uniform porosity.

These and other objects of the invention will be apparent from a reading of the description and the accompanying drawings.

In accordance with the invention a porous aluminum foil is provided having sufficient porosity for use as an anode in a double anode electrolytic capacitor by a first etching of the foil, oxidation of the etched foil, and an electrochemical etch of the previously etched and oxidized foil.

DESCRIPTION OF THE PREFERRED EMBODIMENT

Figure 1A:
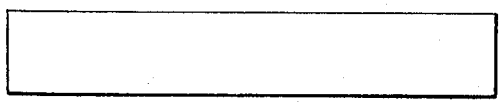
FIGS. 1a–1d illustrate the state of the foil during the sequential steps of the process.

In accordance with the invention porous aluminum foil of about 3–4 mil thickness is produced by sequential etching, oxidizing and re-etching of the foil.

The initial etching of the foil is preferably carried out in an electrochemical etching bath comprising, in a preferred embodiment, an aqueous solution contains 10% by weight NaCl. The bath is maintained at about 90–100° C. A current is passed through the bath for a sufficient time to provide a total charge per square inch of about 7 ampere minutes per inch. (AMSI)

Other etchants such as, for example, hydrochloric acid or other halogen acids or salts could be used in the electrochemical etch bath.

If the foil is to be used in low-voltage forming applications, the foil can be etched over a shorter period of time increasing the current density up to, for example, about 10 amperes per square inch (ASI). For higher voltage forming the current, density should be lower—say about 1 ampere per square inch. This will, of course, necessitate a longer exposure within the etching bath to reach the desired range of 7 ampere minutes per square inch.

After removal from the etching bath, the foil is treated in cold nitric acid (about 7% by weight) to remove chlorine atoms from the foil. A 3–5 minute exposure is sufficient for this purpose.

Alternatively, the nitric acid may be heated to a temperature of from slightly about room temperature to about 100° C. Room temperature treatment in nitric acid removes little aluminum. The amount of aluminum removed rapidly increases with increasing temperature as well as with lengthened exposure time at higher temperatures. Such exposures must be therefore carefully controlled as will be discussed more fully presently.

Alternatively, the electrochemical etch step may be replaced by a purely chemical etch. However, it has been found that chemical etching of aluminum foil of very high purity is not always satisfactory. Since high purity foil is usually preferred for capacitor use, the electrochemical etch—which is not rendered ineffective by the lack of impurities—is therefore the preferred form of etch. However, should lower purity material be used, chemical etching may be substituted for the initial electrochemical etch and therefore should be deemed to be within the scope of the invention.

After the initial etching step, the foil is subject to an oxidizing step comprising exposing the foil to an oxidizing atmosphere at a temperature of about 400–600° C. for a period of from 5–10 minutes to an hour depending upon the temperature.

The etched and oxidized foil is now re-etched in an electrochemical etching bath which preferably comprises a 10% by weight aqueous NaCl solution at a current density of about 1 ampere per square inch for a period of about 1–2 minutes for a total charge of about 1–2 ampere minutes per square inch.

The foil is then treated in cold nitric acid (about 7% by weight) to remove the chlorine as previously described for the first etch step.

The porosity of the foil is now determined. Conveniently this can be measured using the apparatus and method described in the ASTM Test designated D–726–58 Method C. Briefly, this method comprises a measurement of the volume of air passing through a 1" diameter sample (0.785 in.²) in 15 seconds. The sample is placed in a holder communicating with an inverted 100 ml. buret attached at its lower end to a flexible hose which is, in turn, attached to a reservoir. The measuring device is vertically mounted so that the reservoir is initially held at approximately the same level as the top of the buret. With the stopcock of the buret open, sufficient water is placed in the reservoir to raise the level in the buret to ¼" above the zero mark. The device is fixed with a second lower position for the reservoir approximately level with the 100 ml. mark. In this position, the level of the water in the buret falls to the zero mark with the stopcock open and an impervious or non-porous sample in place.

To measure the porosity of the sample, the reservoir is filled with water (while in the upper position) until the water level reaches ¼″ above the zero mark. The aluminum foil sample is then clamped in place and the stopcock on the buret closed. The reservoir is then placed in the lower position and the stopcock then opened. A stop watch is used to measure a 15 second time interval. The stopcock is then closed and the level of water in the buret measured. The drop in the water level indicates the amount of air passing through the sample and therefore its porosity. The higher the reading, the more porous the material.

When using this procedure a porosity of about 35-65 (milliliters in 15 secs.) is considered a satisfactory porosity for the purpose intended.

If the porosity is too low the foil may be chemically etched in warm 7% by weight nitric acid in 1 minute intervals. The porosity test is repeated after each 1 minute interval until the desired porosity is obtained.

While a very low porosity foil, when incorporated into a double anode capacitor, will yield the required capacitance, the dissipation factor has been found to be undesirably high. It is therefore preferred to treat low porosity foils with the chemical etch described above.

It should be noted that the etching solutions described, both for the electrochemical etches and the chemical etches are intended only to be representative materials. Other salts or low strength acids can be used in the electrochemical etch and other acids of equivalent strength can be used in the chemical etch.

As a further evaluation of the overall extent of the etching it should be noted that for 3.5 mil thick foil, the combined amount of metal removed during all the etching steps should not exceed an amount which would leave less than 100 mg. of aluminum per square inch.

Figure 1B:
Figure 1C:
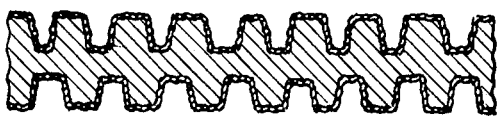
Figure 1D:
Figure 2:
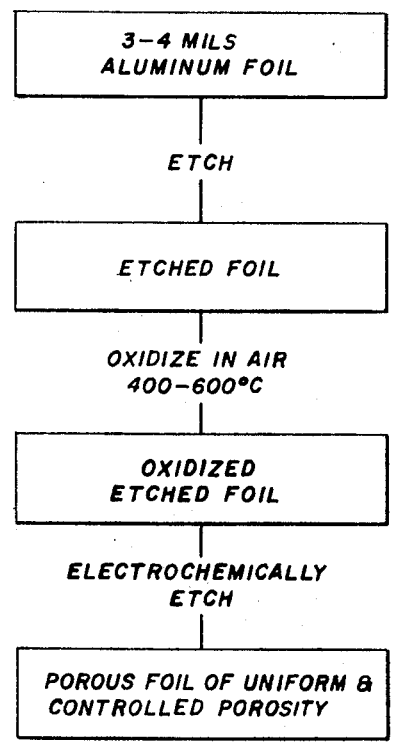
FIG. 2 is a flow sheet of the invention.

While the exact mechanism whereby the combination of electrochemical etching, chemical etching and oxidation produces a foil of uniform porosity is not known, it is believed that the initial etching steps produce an etched foil as illustrated in FIG. 1b. This foil, while deeply etched, contains little, if any, holes or pores. The subsequent oxidation of the etched foil produces an oxide coating over the entire foil. Subsequent electrochemical etching is thought to "punch" through this oxide coating to provide fine pores uniformly throughout the foil without materially enlarging the etch pits, i.e. without removing large amounts of material. The final chemical etch can then be used to enlarge the size of the pores. It is not, however, the intention to be bound by any particular theory or explanation as to the mechanism of the invention.

What we claim as new and desire to secure by Letters Patent of the United States is:

1. The process of making a porous aluminum foil having a sufficient porosity for use as an anode in a double anode electrolytic capacitor which comprises:
   (a) etching an aluminum foil;
   (b) oxidizing the etched foil in an oxidizing atmosphere at a temperature of from about 400° C. to about 600° C.;
   (c) thereafter electrochemically etching the etched and oxidized foil to form pores within the foil.

2. The process of claim 1 wherein said foil has a thickness of about 3-4 mils.

3. The process of claim 2 wherein said initial electrochemical etch provides a current density of about 1-10 amperes per square inch and a total etch current of about 7 ampere minutes per square inch.

4. The process of claim 1 wherein said foil when electrochemically etched is subject to a chemical treatment following said electrochemical etch.

5. The process of claim 4 wherein said chemical treatment is conducted at a temperature above room temperature to etch said foil.

References Cited
UNITED STATES PATENTS

| | | | |
|---|---|---|---|
| 3,371,021 | 2/1968 | Delafosse | 204—141 |
| 3,578,570 | 5/1971 | Kissin | 204—141 |

FOREIGN PATENTS

| | | | |
|---|---|---|---|
| 959,656 | 5/1962 | Great Britain | 204—141 |

JOHN H. MACK, Primary Examiner

T. TUFARIELLO, Assistant Examiner

U.S. Cl. X.R.
156—22; 204—140